(12) United States Patent
Leimbach et al.

(10) Patent No.: US 6,527,499 B2
(45) Date of Patent: Mar. 4, 2003

(54) AUTOMATED TIRE LOADING/UNLOADING AND COMPRESSION SYSTEM AND TIRE TRANSPORT FRAME

(75) Inventors: Wendell B. Leimbach, Baltimore, MD (US); James Wheeler Marshall, Phoenix, MD (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 09/775,910

(22) Filed: Feb. 2, 2001

(65) Prior Publication Data
US 2001/0028838 A1 Oct. 11, 2001

Related U.S. Application Data

(60) Provisional application No. 60/180,392, filed on Feb. 4, 2000.

(51) Int. Cl.$^7$ ............................................... B65G 57/02
(52) U.S. Cl. .................. 414/788; 414/788.3; 414/792.5; 414/792.9; 414/907; 206/304; 206/499
(58) Field of Search ................................. 414/788, 738, 414/908, 788.3, 792.5, 792.9, 910, 907; 206/704, 304.2, 499, 386, 597

(56) References Cited

U.S. PATENT DOCUMENTS

| 3,557,966 | A | * | 1/1971 | Skubic .......................... 211/24 |
| 3,638,790 | A | * | 2/1972 | Schmid et al. ............ 206/65 S |
| 3,822,526 | A | * | 7/1974 | Black ........................ 53/124 D |
| 3,850,295 | A | * | 11/1974 | Black .......................... 206/304 |

(List continued on next page.)

FOREIGN PATENT DOCUMENTS

| JP | 62032036 A | * | 2/1987 | .................. 219/110 |
| JP | 04012902 A | * | 1/1992 | .............. 414/792.9 |
| JP | 04323114 A | * | 11/1992 | .............. 414/792.9 |

*Primary Examiner*—Kathy Matecki
*Assistant Examiner*—Sang Kim
(74) *Attorney, Agent, or Firm*—Snell & Wilmer, L.L.P.; David P. Wood

(57) ABSTRACT

A system and method for automatically loading tires into a tire transport frame is disclosed. The system stacks a plurality of tires in a herringbone pattern within a tire transport frame. The tire transport frame provides a structure that maintains the stacked tires in a stable, compressed state. Further, the tire transport frame may be adapted to withstand external loads so that multiple tire transport frames may be stacked atop one another for long term storage of tires. Further, the loaded tire transport frames may be easily loaded by forklift into a vessel for storage and/or transportation without requiring significant expenditures of manual labor, time, space, or cost. As a result, the instant invention enables significant improvements in reliability, cost, and capacity in the storage and/or transportation of tires. The system of the instant invention comprises a conveyor to maintain a flow of tires; a tire transport frame for receiving and retaining a plurality of tires stacked in a herringbone pattern; and a plurality of pick-and-place loaders for seizing a plurality of tires from the conveyor, rotating the plurality of tires into alignment with one another as well as in complementary herringbone pattern alignment with the tires in the tire transport frame, placing the plurality of tires together, and placing the plurality of tires into the tire transport frame to propagate the herringbone pattern of the stack of tires.

30 Claims, 17 Drawing Sheets

U.S. PATENT DOCUMENTS

| | | | | |
|---|---|---|---|---|
| 3,978,256 A | * | 8/1976 | James | 428/66 |
| 4,397,434 A | * | 8/1983 | Farnham | 244/158 R |
| 4,491,449 A | * | 1/1985 | Hawkins | 414/10 |
| 4,729,709 A | * | 3/1988 | Raash | 414/399 |
| 4,773,547 A | * | 9/1988 | Bell | 211/194 |
| 4,941,798 A | * | 7/1990 | Meier | 414/619 |
| 5,064,334 A | * | 11/1991 | Cooley | 414/428 |
| 5,201,427 A | * | 4/1993 | Dowty | 211/23 |
| 5,205,221 A | * | 4/1993 | Melin et al. | 108/51.3 |
| 5,265,999 A | * | 11/1993 | Wenschhof et al. | 414/226 |
| 5,372,469 A | * | 12/1994 | Kobayashi | 414/543 |
| 5,606,921 A | * | 3/1997 | Elder et al. | 108/53.3 |
| 5,681,141 A | * | 10/1997 | Critel | 414/789.02 |
| 5,697,294 A | * | 12/1997 | Keller et al. | 100/100 |
| 5,769,003 A | * | 6/1998 | Rose et al. | 108/55.3 |
| 5,816,142 A | * | 10/1998 | Keller et al. | 100/35 |
| 5,888,612 A | * | 3/1999 | Needham et al. | 428/116 |
| 5,894,044 A | * | 4/1999 | Norcom et al. | 428/116 |
| 5,960,720 A | * | 10/1999 | Borland et al. | 108/53.1 |
| 6,298,999 B1 | * | 10/2001 | Bellman | 211/24 |

* cited by examiner

AUTOMATED TIRE LOADING/UNLOADING AND COMPRESSION SYSTEM AND TIRE TRANSPORT FRAME

CROSS REFERENCE TO RELATED APPLICATION

This application claims benefit from U.S. Provisional Patent Application Ser. No. 60/180,392 filed Feb. 4, 2000, which is hereby incorporated by reference.

FIELD OF THE INVENTION

The present invention generally relates to systems for transporting vehicle tires and, more particularly, to a system and method for automatically loading and unloading vehicle tires and compressing vehicle tires for storage and/or transportation within a tire transport frame.

BACKGROUND OF THE INVENTION

The tire distribution process currently requires transporting large quantities of tires from the plants where they are manufactured to the various facilities where tires are delivered to consumers and/or mounted on vehicles. Typically, the processes for transporting tires from these plants to wholesalers, retailers, and service centers involve the use of large vessels. For example, semi-trailers are used for transportation over the road, rail cars are used for transportation via rail, and shipping containers are used for transportation over water. Further, these vessels provide storage of tires prior to and after transport.

To minimize the costs associated with such storage and transportation, it is desirable to pack the tires into each storage and/or transportation vessel in such a manner as to maximize the density of tires within the vessel while providing satisfactory stability of the loaded tires and avoiding permanent deformation of the loaded tires. Maintenance of the tires under a compressive load has been found to improve the stability of the loaded tires. Unfortunately, though, compression can lead to permanent deformation of the tires in some stacking configurations. Thus, a variety of stacking arrangements have been tested, each with its inherent difficulties.

One stacking arrangement that has been used extensively is called the stovepipe. This stacking arrangement is characterized by several tires stacked directly atop one another, aligned along a single axis, the axis of rotation, which is oriented vertically. In this type of stacking arrangement, the outer diameter or treaded portion of the tires on the bottom of the stovepipe stack must absorb the load caused by the weight of the tires above. In general, stacking tires in the stovepipe configuration tend to cause the treads of the tires to bow outward such that the tires, once installed on a vehicle, track along their centerlines. If there is sufficient heat and/or time during transport and storage, the deformation can be permanent. This inherent tendency toward deformation of the stovepipe-stacked tires precludes the use of excessive compression to enhance the stability of a stovepipe stack of tires. Moreover, the volume of empty space along the central axis of each stack is not utilized.

A more desirable stacking configuration is the herringbone pattern. This configuration is characterized by the tilting of all of the tires in a row such that their axis of rotation are parallel to one another and lie substantially in the same plane, but are offset. Rows of tires are stacked atop one another with the directions of the axis of rotation of successive rows being alternated, in a single plane, approximately equally about the vertical direction. Depending on the geometry of the tires being stacked, the angle between the rotational axis of tires in successive rows varies from approximately 10 degrees to approximately 60 degrees.

Packing tires in this herringbone pattern simultaneously provides stability and efficient use of the storage and/or transportation space while preventing permanent deformation of the tires in the stack so long as the period of storage is not excessive. Typical storage periods range from a week to approximately a month. In a herringbone pattern of stacking, the outer diameter tread portion of one tire is nestled against the sidewall near the hub or bead region of another tire. Compression of the sidewall at the hub region of a tire along the axis of rotation includes less risk of creating permanent deformation of the tire than compression of the tread portion in the same axial direction. Thus, the herringbone pattern of stacking is preferred to the stovepipe stacking arrangement.

Unfortunately, however, no fully automated process or apparatus exists to stack tires in a herringbone pattern. Thus, tires are typically packed into the storage and/or transportation vessels by hand. Using conventional hand-packing techniques, however, is labor intensive, relatively slow, and inherently unreliable. It can become quite cumbersome to pack tires uniformly from the floor of the vessel to the ceiling when doing so by hand. Large tires can be difficult to manipulate manually, especially when loading tires near the top of the vessel. Hand stacking can be inconsistent and unreliable and can yield non-uniform, unstable loads. Further, there exists no reliable system or method for compressing the hand-stacked tires to improve the stability of the load.

To partially remedy these problems, devices have been developed to help in the compression of the tire stacks. These systems, however, continue to rely heavily upon manual labor to accomplish the stacking of the tires. For example, U.S. Pat. No. 5,697,294, which is hereby incorporated by reference, discloses an exemplary tire compression device. U.S. Pat. No. 5,816,142, which is also hereby incorporated by reference, discloses another tire compression device, this one being intended for use with a forklift. This device allows a preset load to compress a stack of tires as the stack is loaded into a truck trailer. Initially, the forklift elevates and supports the preset load. Then, once the tires are stacked beneath the elevated load, the forklift allows the load to be lowered against a stack of tires. As a result, the load exerts a downward pressure on the stack of tires, thereby compressing the tires. Once the initial stack is compressed, additional uncompressed tires are loaded on top of the stack until the stack reaches the ceiling of the truck trailer. Then, the forks of the forklift are raised, partially releasing the pressure applied against the compressed portion of the stack and allowing it to expand while compressing the previously uncompressed portion until the entire stack is equally compressed. This process is repeated, stack by stack, until the entire trailer is full of stacked, compressed tires. Other devices exist that load tires into a truck trailer and similarly compresses the tires within the trailer. In each of these cases, the tires are maintained in compression by the storage and/or transportation vessel itself. There is no assurance, however, that the vessel was designed or is suitable to maintain such loads. In fact, vessels are frequently damaged as a result of such use.

When the storage and/or transportation within the vessel is complete, the tires are typically manually unloaded from the vessel onto a conveyor or pallet. A variety of implements exist for such handling of tires. For example, U.S. Pat. No.

3,822,526, which is hereby incorporated by reference, discloses a device for manipulating tires. No device, however, is known in the art that sufficiently eliminates the difficulties of manually stacking tires in a storage and/or transportation vessel and unloading the compressed tires from the same vessel. Moreover, no sufficient device currently exists to eliminate the reliance on the vessel to maintain a compressive load on the tires. Further, although there are loaders for tires, for example, a machine loader and a loader to create a straight stack of tires, none of the loaders currently in the art are designed to stack tires in a herringbone pattern.

The lack of a fully automated system and method for loading and compressing tires in a storage and/or transportation vessel adds unnecessary cost to the shipment of tires. Current systems such as those described above are capable of loading tires into a vessel at the rate of approximately two tires per minute per person. Furthermore, the maximum number of workers who can efficiently cooperate to load tires into a single vessel is three. Therefore, the maximum rate at which a single vessel can be loaded is approximately six tires per minute. At this rate, a single vessel with a capacity of twelve hundred tires takes approximately three hours to fill, and a tire manufacturing plant that produces thirty thousand tires per day must have facilities for simultaneously loading approximately four vessels. If, however, the rate at which the tires are loaded could be increased, fewer vessels would need to be loaded simultaneously, and less space would be required for the loading facility. For example, if the rate at which the tires could be loaded were increased to twenty tires per minute, a vessel could be loaded every hour, and the same facility producing thirty thousand tires per day could require only one vessel to be loaded at a time. As a result, less space would be required for the loading of the tires, and more efficient product flow arrangements might be possible.

A variety of additional difficulties exist as a result of reliance on the hand loading and unloading of tires. For example, loaded tires sometimes inadvertently, and unexpectedly, release their stored energy, often causing personal injury and/or other collateral damage. Initial attempts to design a device to automatically compress a stack of tires have revealed a variety of problems. For example, where the stack of tires is compressed a first direction, such as vertical, causing it to expand in a second direction, horizontal.

It would therefore be advantageous to have a system and method for increasing the rate at which tires can be loaded into a vessel for transportation and/or storage while simultaneously increasing the density of the tires packed into each vessel. It would also be advantageous to have a system and method for loading tires into a vessel for transportation and/or storage with improved safety, reliability, and stability. It would further be advantageous to have a system and method for loading tires into a vessel for storage and/or transportation whereby the permanent deformation of the tires would be prevented. It would also be advantageous to have a system and method for automatically packing tires into a vessel in a herringbone pattern for storage and/or transportation of the tires. It would also be advantageous to have a system and method for loading tires into a vessel whereby compressive loads applied to the tires were not applied or maintained by the vessel itself and where the danger of inadvertent release of the energy stored in the compressed tires could be minimized.

In addition, it would be advantageous to have a system and method for loading tires into a vessel for storage and/or transportation whereby tires could be automatically loaded into a tire transport frame such that the tire transport frame could be moved into the vessel by forklift. It would also be advantageous to have a system and method for loading tires into a tire transport frame outside of the vessel for storage and/or transportation whereby the tire transport frame would hold the stacked tires in a compressed state and keep the stacked tires in proper alignment during shipment and storage. Finally, it would be advantageous to have a system and method for loading tires into a vessel for storage and/or transportation whereby the loading could be automatic, thereby reducing the labor, time, space, risk of injury, and cost required for loading and unloading of the tires, while enhancing the safety of the process.

SUMMARY OF THE INVENTION

The present system and method accomplishes these objectives while overcoming the above described deficiencies in the art. The system of the present invention provides an apparatus that automatically and reliably stacks a plurality of tires in a herringbone pattern within a tire transport frame. The tire transport frame provides a structure that retains the stacked tires in a stable, compressed state. Further, the tire transport frame may be adapted to withstand external loads so that multiple tire transport frames may be stacked atop one another for storage of tires without compressing the tires excessively. Further, the loaded tire transport frames may be easily loaded by forklift into a vessel for storage and/or transportation without requiring significant expenditures of manual labor, time, space, or cost. As a result, the instant invention enables significant improvements in reliability, cost, safety, and capacity in the storage and/or transportation of tires.

The present invention comprises a conveyor to maintain a flow of tires; a tire transport frame for receiving and retaining a plurality of tires stacked in a herringbone pattern; and a plurality of pick-and-place loader for seizing a plurality of tires from the conveyor, rotating the plurality of tires into alignment with one another as well as in complementary herringbone pattern alignment with the tires in the tire transport frame, placing the plurality of tires together, and placing the plurality of tires into the tire transport frame to propagate the herringbone pattern of the stack of tires. In addition, the system includes a control system that is able to determine the most efficient stacking configuration based on the geometries of the tires such as inner and outer diameter and tread width, or any other set of parameters indicative of same.

The method comprises providing a flow of tires on a conveyor, seizing a plurality of tires from the conveyor, rotating the plurality of tires into alignment with one another as well as in complementary herringbone pattern alignment with the tires in the tire transport frame, placing the plurality of tires together, placing the plurality of tires into the tire transport frame to propagate the herringbone pattern of the stack of tires, compressing the herringbone pattern stack of tires within the tire transport frame, and fixing the retaining member to complete the tire transport frame.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

DETAILED DESCRIPTION OF EXEMPLARY EMBODIMENTS

Figure 1:
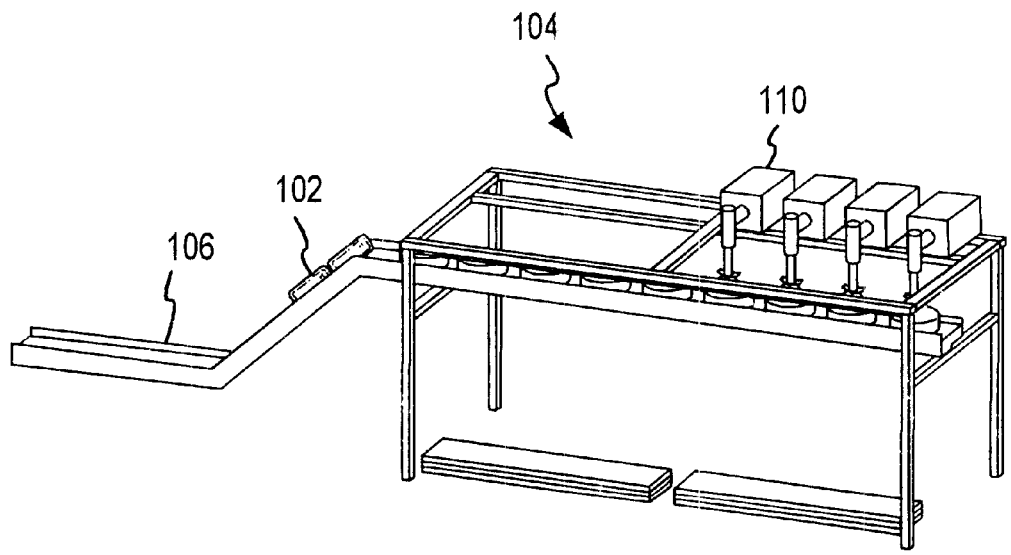
FIG. 1 is an illustration of an exemplary tire loading and stacking system.

It should be appreciated that the particular implementations shown and described herein are illustrative of the invention and its best mode and are not intended to otherwise limit the scope of the present invention in any way. Indeed, for the sake of brevity, trivial and conventional features and aspects of the present invention may not be described in extensive detail herein. Furthermore, the connecting lines shown in the various figures shown herein are intended to represent exemplary functional relationships and/or physical couplings between the various elements of the system. It should be noted that many alternative or additional functional relationships or physical connections may be present in a practical tire loading system.

The present invention provides a system and method for automatically loading and unloading tires and for compressing tires within a tire transport frame. The frame may be a separate device or a similar structure incorporated into a vessel or building. In an exemplary embodiment, the system includes two substantially identical sides, which are used simultaneously to provide continuous tire loading. While one side is performing the loading process, the other side is performing the compression process. Typically, the loading process includes the steps of transporting the tires, on a conveyor in an exemplary embodiment, to a pick-and-place location where, a plurality of pick-and-place loaders, typically numbering between three and six, perform a series of operations to rotate and translate the tires into the proper orientation and position and stacking them. These rotation and translation operations typically include seizing the tires, rotating the tires, placing the tires together, moving the set of tires to interleave position, and placing the set of tires in interleaving fashion atop the previously stacked tires, or, if none have been stacked, atop the lower retainer on the platform against a wedge. A compressor accomplishes the compression of the entire stack of tires by translating the upper retainer and the lower retainer of a tire transport frame relative to one another to compress a stack of tires located therebetween. Alternative embodiments of the compressor accomplish the compression of the tires by translating the stack of tires vertically upward toward a stationary upper retainer, or by translating an upper retainer vertically downward against a stack of tires that is supported by a stationary lower retainer, or by simultaneously translating both the stack of tires in a vertical upward direction and an upper retainer vertically downward against the stack of tires. The compressor may accomplish the translation of the retainers through use of any of a variety of mechanisms including a scissors lift or any other sort of adjustable height mechanism motivated by hydraulic or pneumatic cylinders, electric motors or pumps, gear systems, pulleys, gears and/or the like. It should be noted that the order of the steps denoted in this disclosure is not intended to be limiting, and the steps may be accomplished in different orders without deviating from the scope of the present invention.

Figure 2:
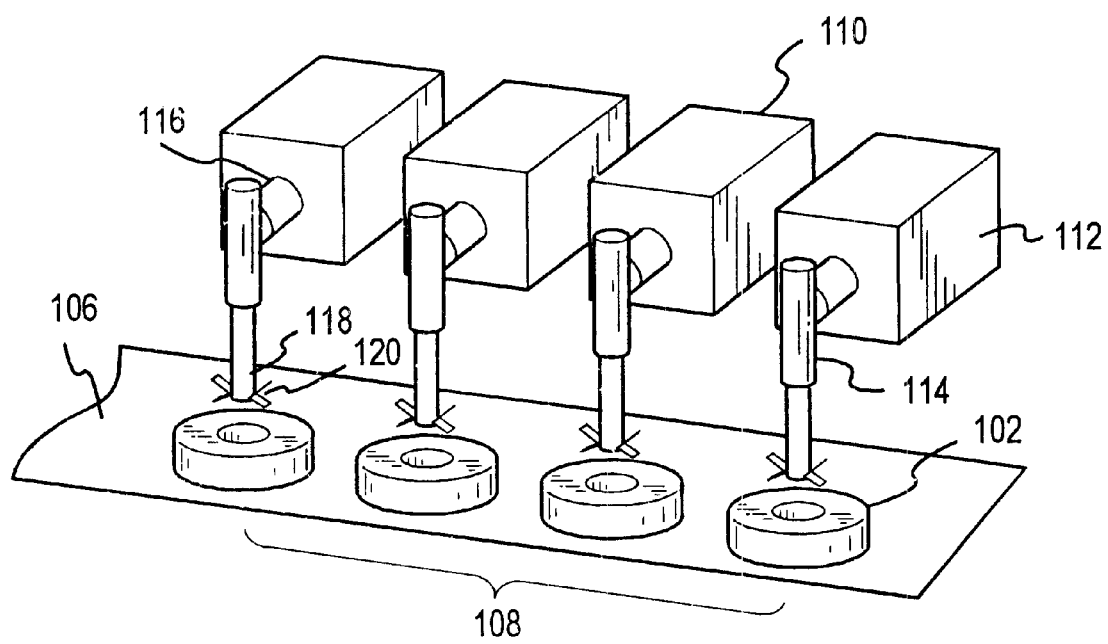
FIG. 2 is an illustration of an exemplary apparatus for rotating tires to be stacked in a herringbone pattern.
Figure 11:
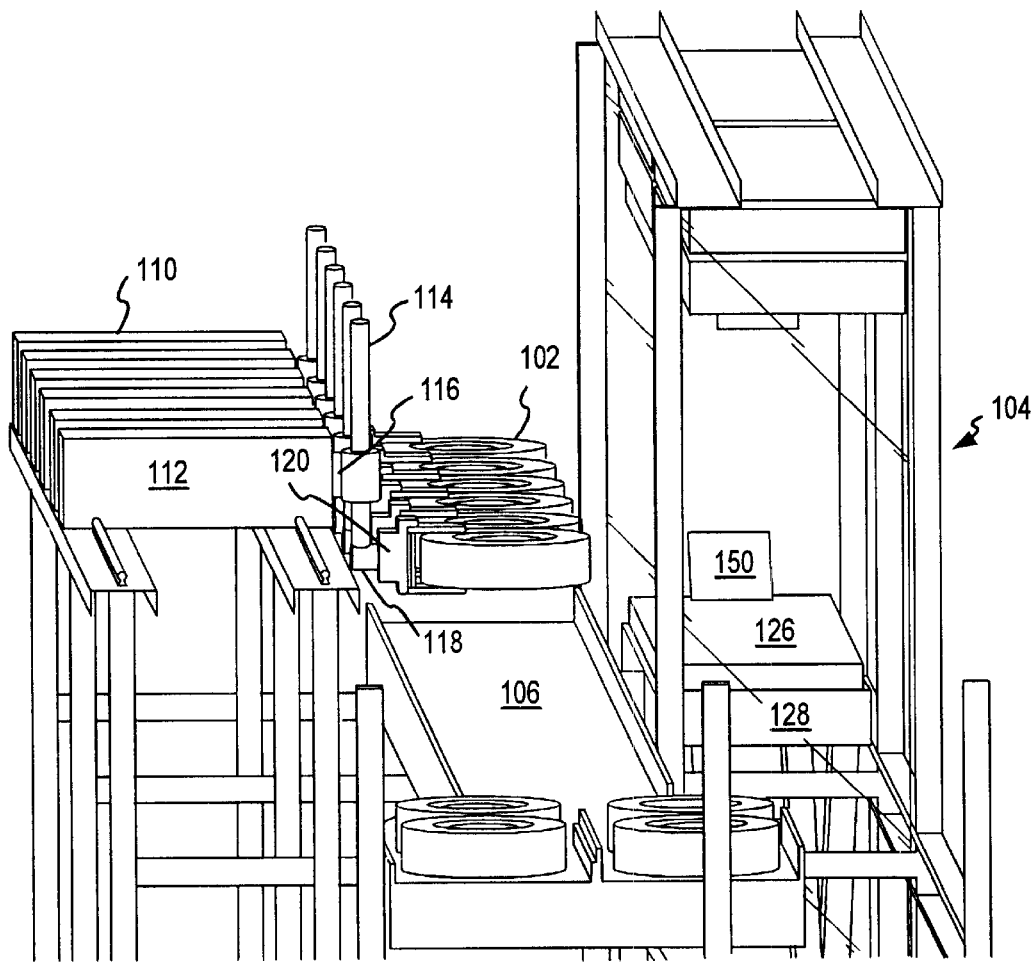
FIG. 11 is an illustration of a side view of an exemplary tire loading and stacking system depicting a first plurality of tires that have been seized by a plurality of pick-and-place loaders.

As shown in FIG. 1, in an exemplary tire loading process, a conveyor 106 presents tires 102 to the pick-and-place loaders 110 of the automatic tire loading and unloading system 104. In alternative embodiments, the tires may exist in a suitable location and arrangement without the need for a conveyor. With reference to FIG. 2, the conveyor 106 elevates the tires to a stop position 108 in front of the dual position pick-and-place loaders 110. The pick-and-place loaders 110 each comprise a support-mounted actuator system 112, each of which controls an extendable/retractable arm 114 that is adapted to seize a tire 102 from the conveyor 106. Each of the extendable/retractable arms 114 has a first end 116 rotatably attached to the actuator system 112 and a second end 118 having a tire seizer 120. As one skilled in the art appreciates, the extendable functionality of each extendable/retractable arm 114 may be provided by a variety of mechanisms including a scissoring plurality of hinged members or, as shown in FIG. 11, a telescoping plurality of concentric cylinders or a member adapted to slide along a guide or set of guides. As one skilled in the art appreciates, the tire seizer 120 may be any device adapted for seizing a tire including, as shown in FIG. 2, a plurality of members adapted to clamp the bead of the inner diameter of a tire or a plurality of members adapted to compress a tire from its outer diameter or tread in the direction of the tire's radial direction. In another exemplary embodiment, as shown in FIG. 11, the tire seizer 120 is adapted to seize a tire from its outer diameter by compressing the sidewalls of the tire in the direction of the tire's axis of rotation.

Figure 7:
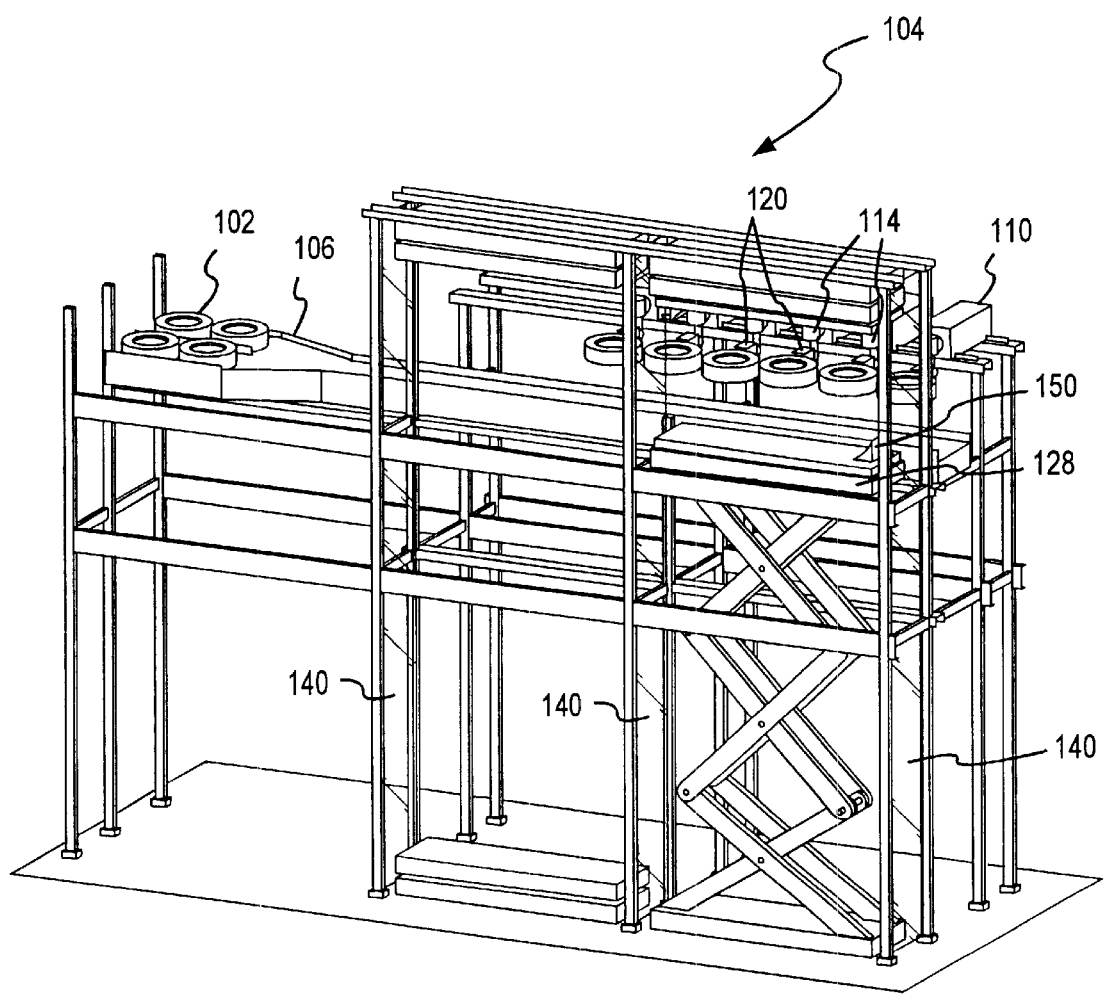
FIG. 7 is an illustration of an exemplary tire loading and stacking system depicting a first plurality of tires that have been seized by a plurality of pick-and-place loaders.

Initially, the extendable/retractable arms 114 of the pick-and-place loaders 110 are retracted to allow the tires 102 to be moved by the conveyor 106 to positions proximate the tire seizer 120. Once the tires have been transported into a position that facilitates their being seized, the extendable/retractable arms 114 are extended to positions suitable for seizing the tires 102. These positions may be set by the adjustment of a mechanical position stop or by the position of an actuator that is adapted to respond to a signal from a control system that itself is adapted to accommodate inputs sufficient to identify tire geometry and produce an appropriately responsive position command. As shown in FIGS. 7 and 11, once the tire seizer 120 is in the proper location, it seizes the tires, and the extendable/retractable arms 114 are retracted to remove the tires 102 from the conveyor 106.

Figure 3:
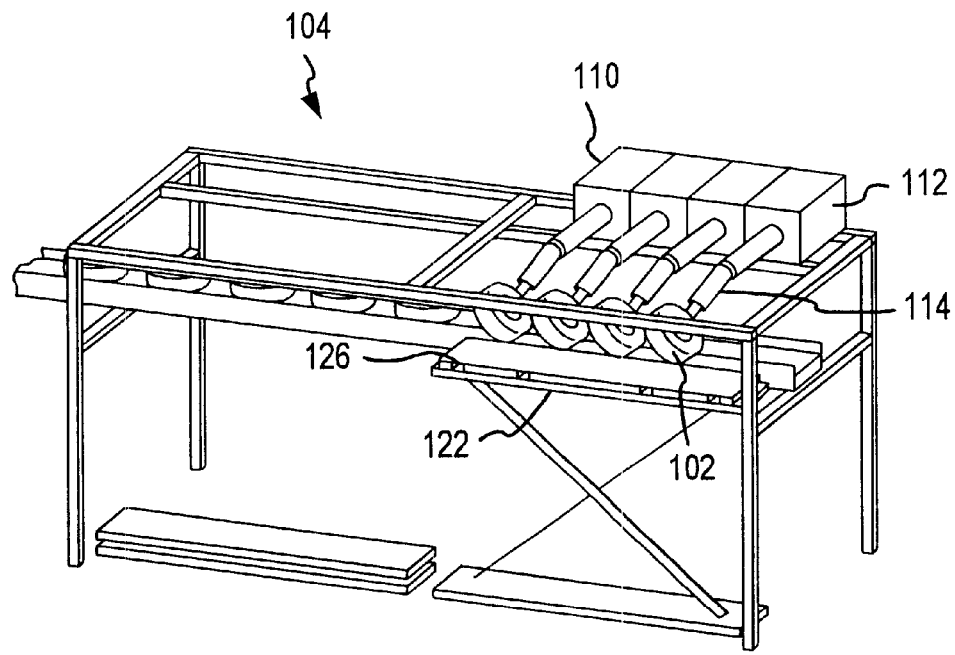
FIG. 3 is an illustration of an exemplary elevated platform fully extended to its highest position and a first plurality of tires being rotated to substantially 45° elevation from the elevated platform for forming a first row of the herringbone pattern stack of tires.
Figure 4:
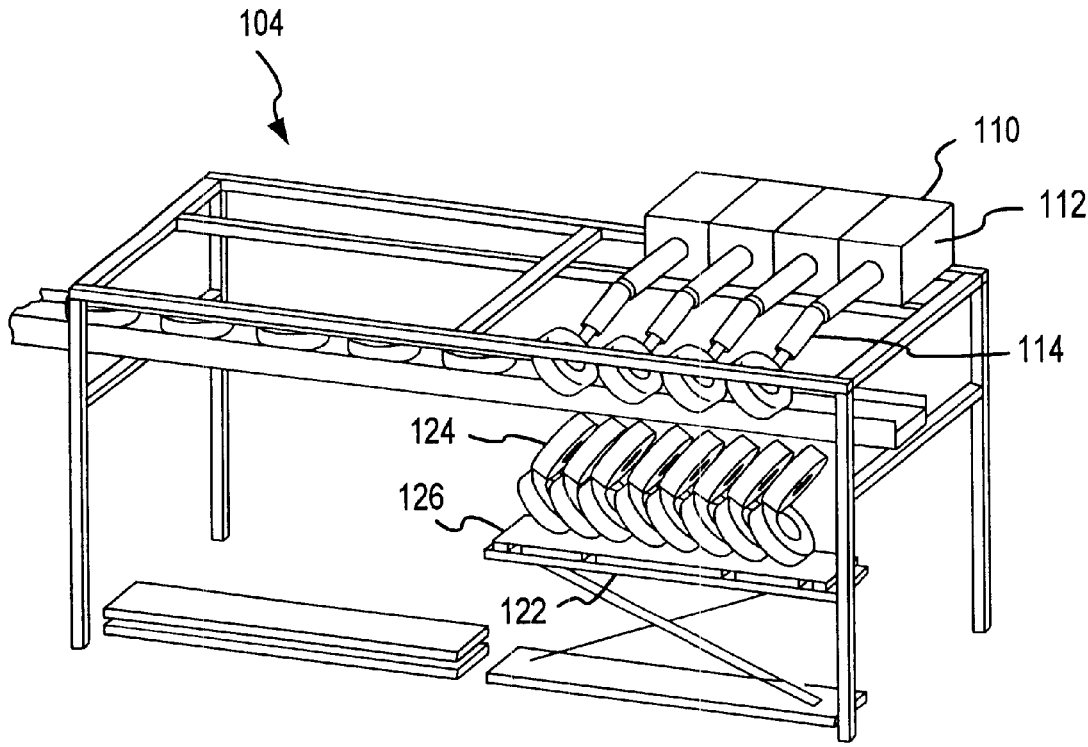
FIG. 4 is an illustration of an exemplary platform having in a partially lowered state to accommodate the further stacking of tires atop two rows of herringbone pattern stacked tires.
Figure 8:
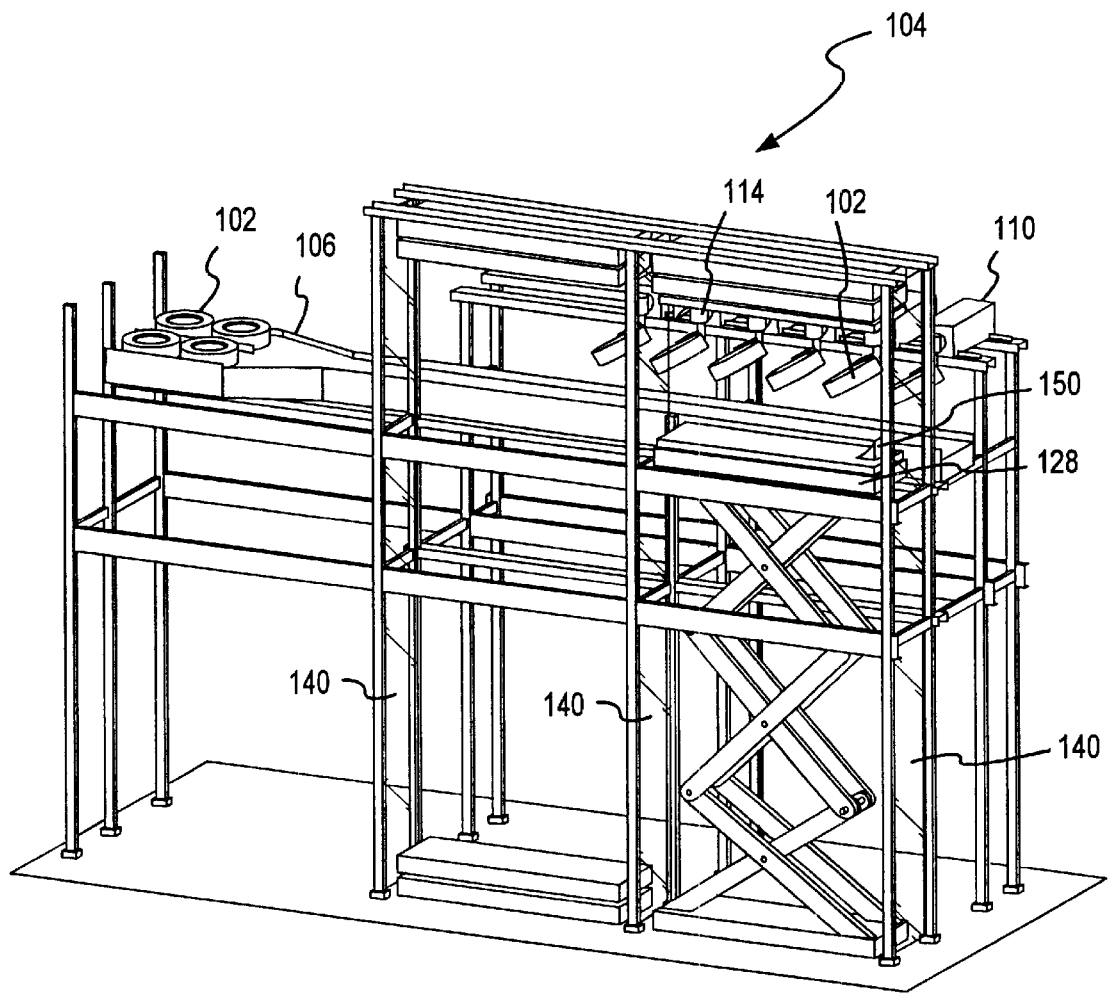
FIG. 8 is an illustration of an exemplary tire loading and stacking system depicting a plurality of tires that have been seized and rotated by a plurality of pick-and-place loaders.
Figure 9:
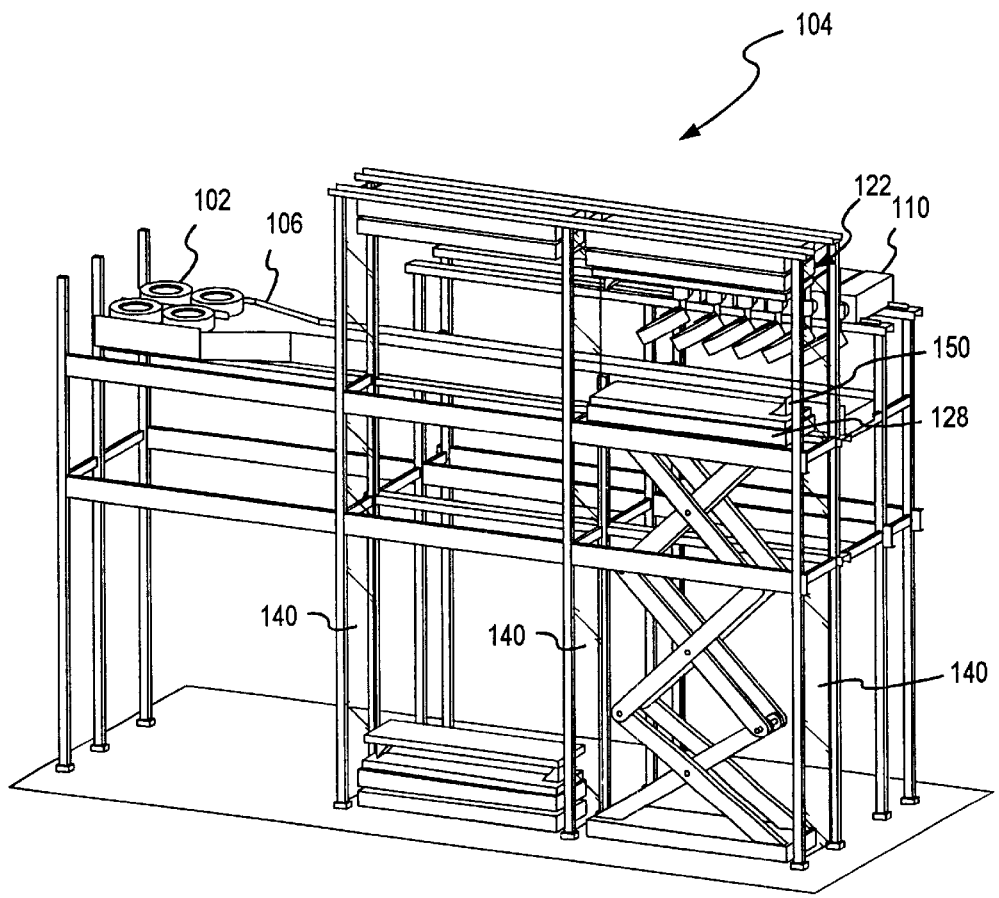
FIG. 9 is an illustration of an exemplary tire loading and stacking system depicting a plurality of tires that have been seized, rotated, and placed together by a plurality of pick-and-place loaders.
Figure 12:
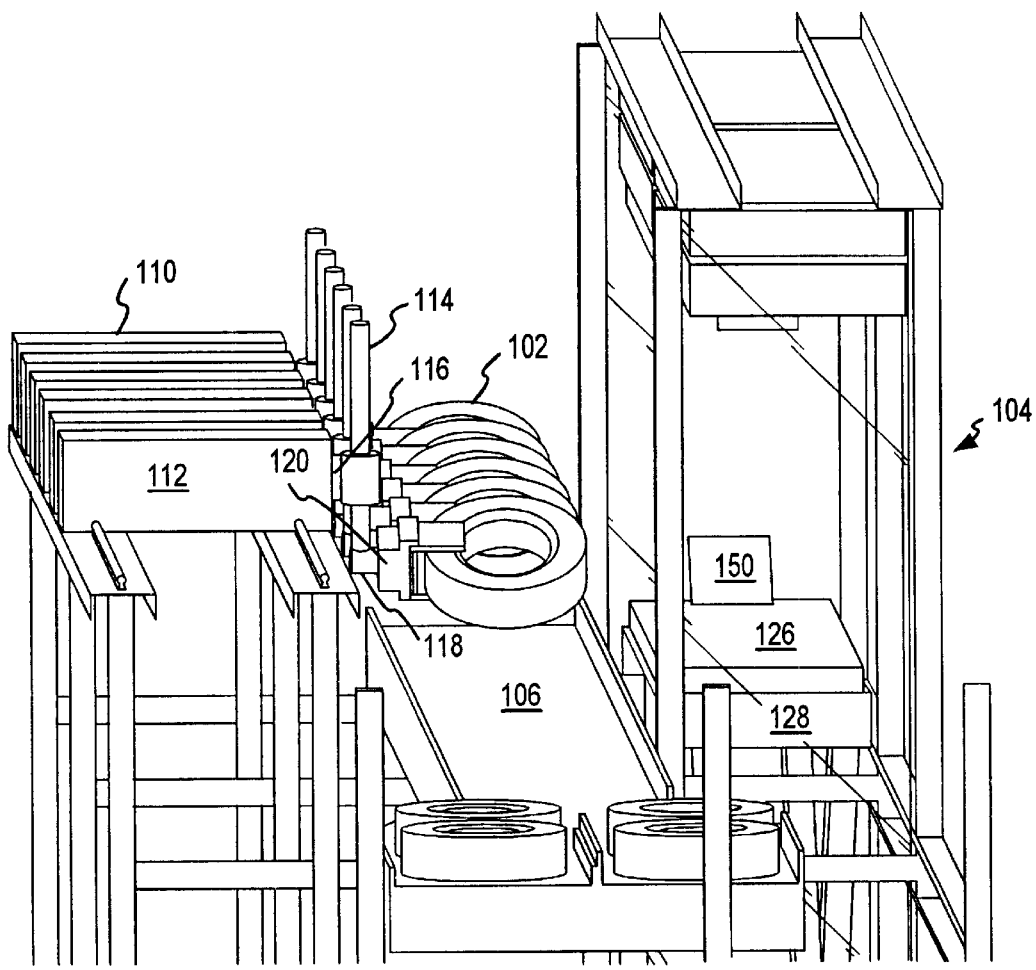
FIG. 12 is an illustration of a side view of an exemplary tire loading and stacking system depicting a plurality of tires that have been seized and rotated by a plurality of pick-and-place loaders.
Figure 13:
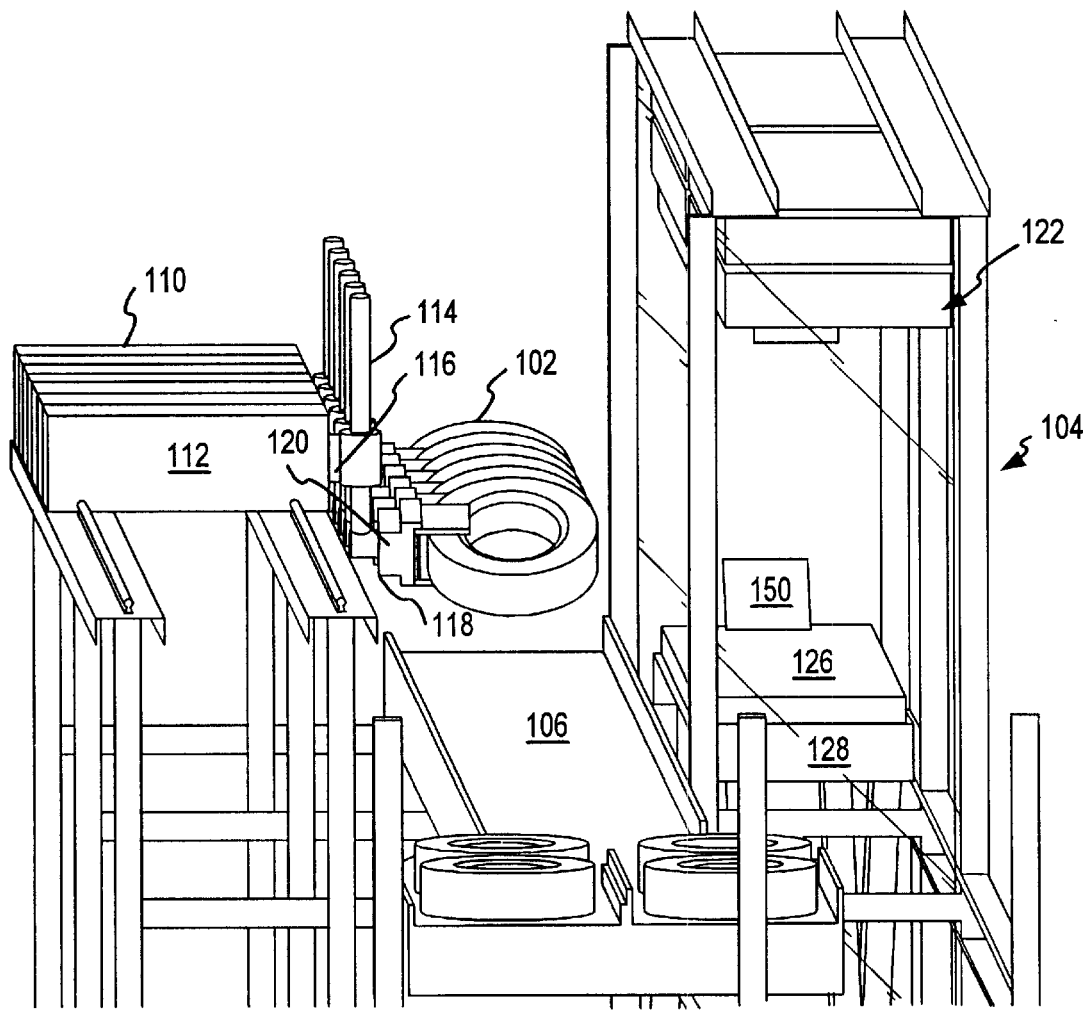
FIG. 13 is an illustration of a side view of an exemplary tire loading and stacking system depicting a plurality of tires that have been seized, rotated, and placed together by a plurality of pick-and-place loaders.

As shown in FIGS. 3, 8, and 12, having seized the tires 102, the extendable/retractable arms 114, and therefore the tires, are rotated. Then, as shown in FIGS. 9 and 13, the rotated tires are translated and articulated to place the plurality of tires 102 into alignment with one another as well as in complementary alignment with the tires in the tire transport frame 122. As shown in FIG. 4, the extendable/retractable arms 114 then rotate and elongate to place the plurality of tires together, and then place the plurality of tires into the tire transport frame 122 to propagate the herringbone pattern 124 of the stack of tires. The present invention also includes the stacking of the tires in any other suitable arrangement that would allow the transport frame to perform similar functions. Moreover, the present invention includes any variation or angle of herringbone patterns that would allow the transport frame to perform similar functions as disclosed herein.

As one with ordinary skill in the art appreciates, the proper alignment of tires in the herringbone pattern 124 depends upon the geometry of the tires being so stacked.

Thus, the system and method of the instant invention contemplates and accommodates incorporation of an automated system for control of the loader system. The control system may automatically sense tire geometry based on sensors located at an upstream position on the conveyor or may alternatively accommodate the manual input of information. In both cases, however, the control system uses information that is indicative of tire geometry, such outside diameter, inside diameter, and tread width, to determine the rotation and translation of each tire necessary to produce the desired stacking pattern. With respect to herringbone stacking patterns 124, the relevant output variables include the angle of deviation from vertical associated with the axis of rotation of tires in successive rows as well as the number of tires in each row and the number of rows in each stack. Furthermore, the control system may determine the appropriate amount of compression to apply to the stacked load, and the corresponding number of rows in the stack, to avoid permanent deformation of the tires. The control system of the instant invention considers a variety of factors in determining the appropriate compressive loads to apply. In a preferred embodiment, these factors include the material properties and/or hardness of the tires (usually rubber), tire geometry and stacked orientation, and the time and temperature environment to which the compressed tires will be subjected. In addition, empirical data and experience may be incorporated to optimize the control of the system.

Figure 6:
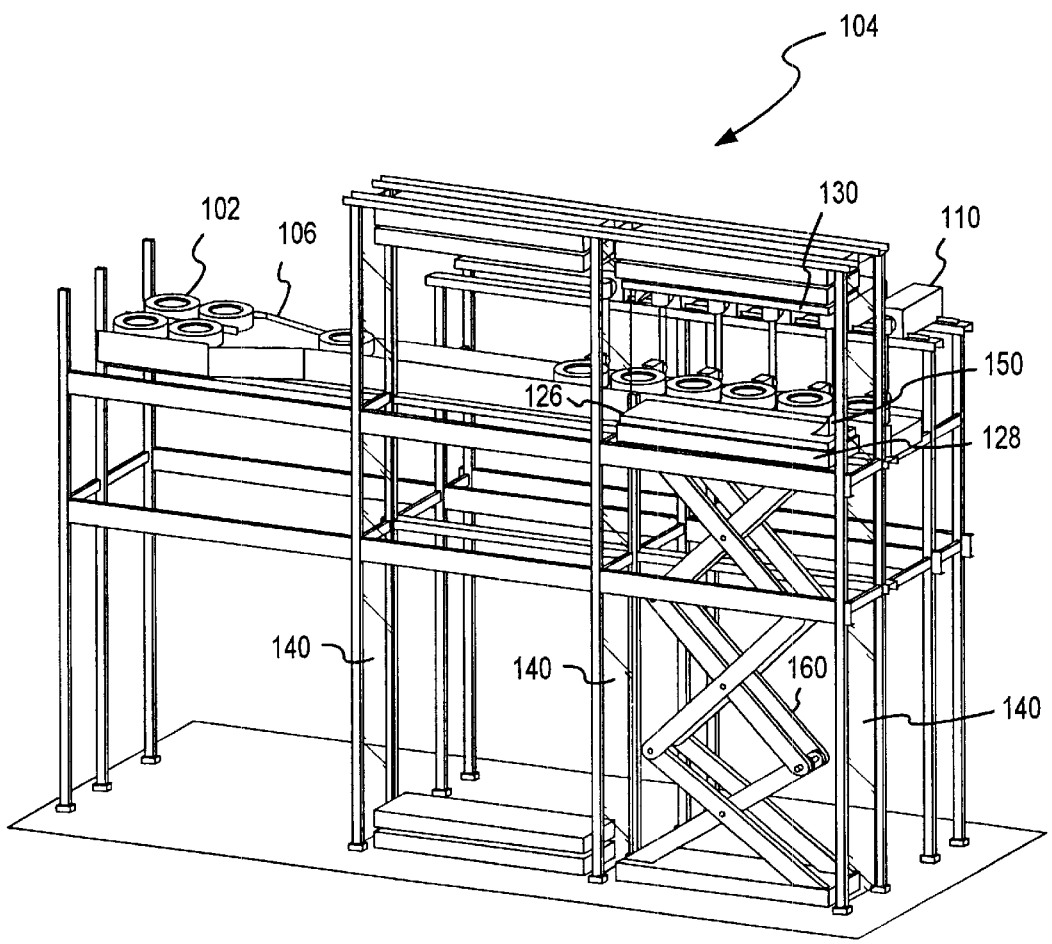
FIG. 6 is an illustration of an exemplary tire loading and stacking system depicting an elevated platform in position for receiving a row of tires together with a plurality of tires having been transported by a conveyor to a stop position adjacent to a plurality of pick-and-place loaders.
Figure 14:
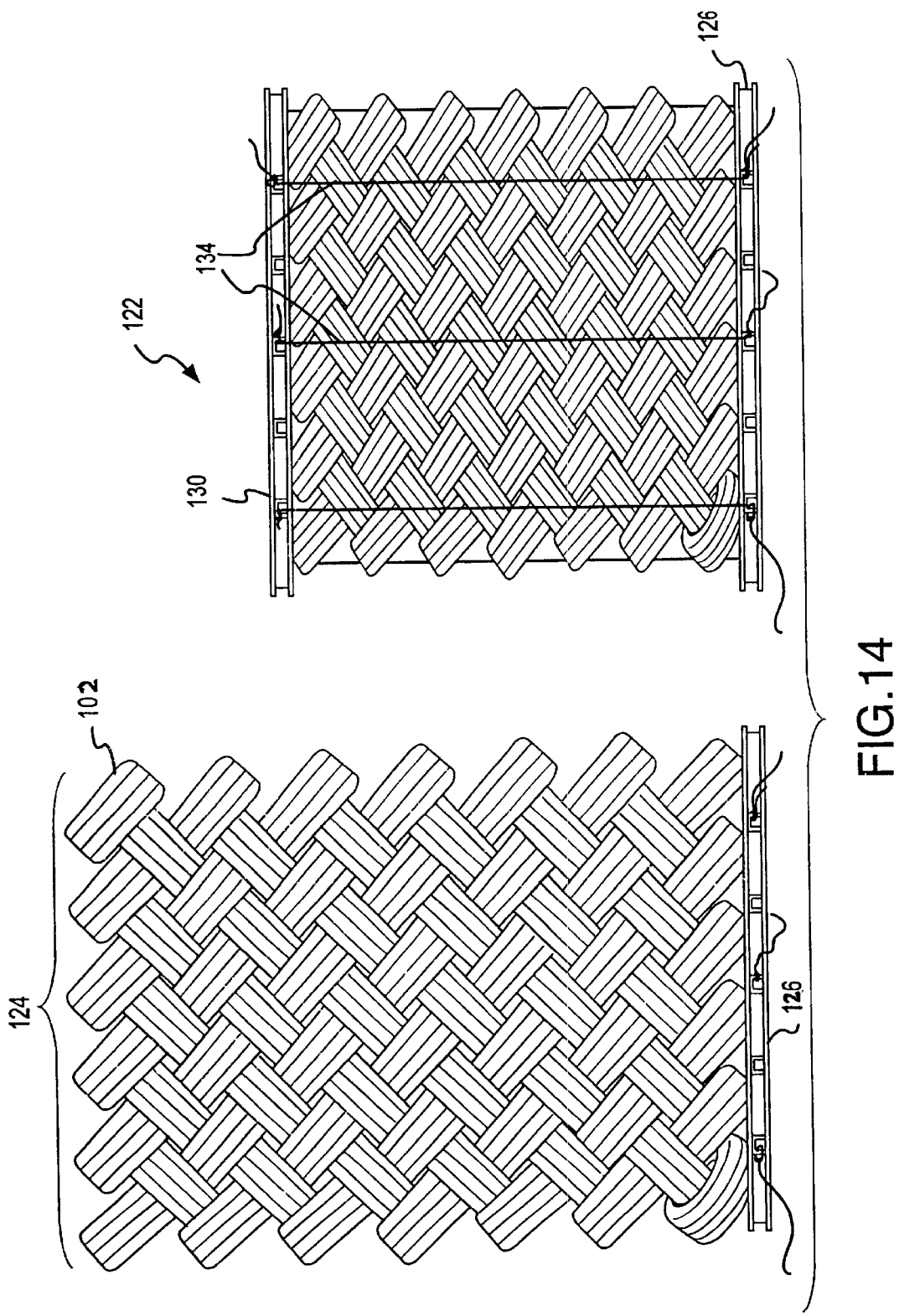
FIG. 14 is an illustration of two exemplary herringbone pattern stacks of tires, one in an uncompressed state and the other in a state of compression retained by an exemplary tire transport frame to form a loaded tire transport frame.

As shown in FIG. 3, the tire loading and unloading system 104 and its plurality of individual pick-and-place loaders 110 grasp the tires 102 and place them on a lower retainer 126 in a herringbone pattern 124. In an exemplary embodiment, the loading system comprises a plurality of pick-and-place loaders 110, depending on the width of the tires be stacked and the width of the tire transport frame 122 on which the tires are to be placed. The motions to grasp and place the tires 102 in a herringbone pattern 124 require that each pick-and-place loader 110 move relative to each other. As shown in FIGS. 3 and 4, the lower retainer 126 is located on an elevated table that is raised and lowered in relation to the pick-and-place loaders 110 to permit additional rows to be added to the tire transport frame 122. The raising and lowering of the platform may be accomplished by a variety of mechanisms including, as shown in FIG. 6, a scissors mechanism. The tires are stacked on top of each other in rows the width of the tire transport frame 122. As shown in FIG. 14, the rows are built up to a stack that is approximately one-half to one times higher than the height of the storage and/or transportation vessel.

Figure 5:
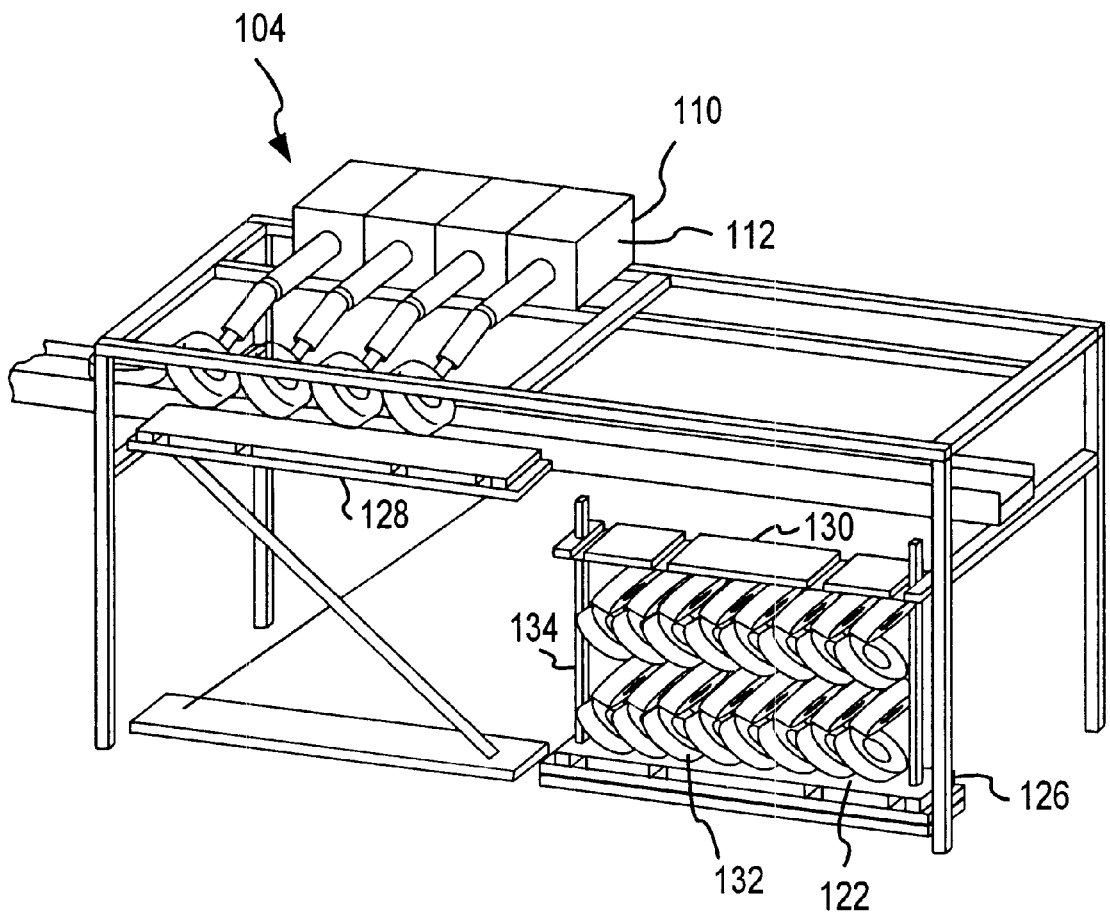
FIG. 5 is an illustration of an exemplary dual position loader system comprising a stacked-tire assembly in a state of compression retained by an exemplary tire transport frame together with an exemplary plurality of pick-and-place loaders in a second position loading tires in a second tire transport frame.

As illustrated in FIGS. 5, when the stacking process is completed with respect to a first tire transport frame 122, the pick-and-place loaders are shuttled to a second elevated table 128, and the stacking process starts again. This provides continuous loading service. While the new stack is being loaded, an upper retainer 130 is placed on the initial stack 132. As shown in FIG. 6, the compressor 160 presses the upper retainer 130 and the lower retainer 126 toward one another to compress the tires 102, typically to the height of the storage and/or transportation vessel. Then, as shown in FIG. 14, the upper retainer 130 and the lower retainer 126 are locked together by a locking apparatus 134 to secure the tires during shipment and storage For safety, and to minimize damage to the tires and the equipment, compression of the tires must be conducted in a controlled manner. In the system of the instant invention, tire geometry and hardness is considered, and appropriate control is exercised to achieve proper tire compression. As discussed above, proper tire compression provides load stability and efficiency without over-compressing the tires and permanently deforming them. Therefore, the system of the instant invention provides adjustable tooling to control a wide variety of tire sizes and geometry during the stacking process. The system and method of the instant invention is equally applicable to a wide range of tire sizes and geometry including bicycle tires, automobile tires, truck tires, tractor-trailer tires, farm equipment tires, aircraft tires, and tires for earth moving or mining equipment. The system and method is also applicable to any product or device which is capable of being stacked using a similar process.

The compressor translates the upper retainer 130 and/or the lower retainer 126 of a tire transport frame 122 relative to one another to compress a stack of tires located therebetween. This compression may be accomplished by translating the entire stack vertically toward a stationary upper retainer 130, or by translating an upper retainer 130 vertically downward against a stack of tires that is supported by a stationary lower retainer 126, or by simultaneously translating both the entire stack in an upward direction against an upper retainer 130 that is simultaneously translated in a downward direction. The translation of the retainers may be accomplished by a variety of mechanisms including a scissors lift, as shown in FIG. 6, or any other sort of adjustable height mechanism motivated by hydraulic or pneumatic cylinders, electric motors or pumps, gear systems, pulleys, and/or gears. Moreover, the use of "vertical" herein is a relative term such that the invention contemplates a similar horizontal or angled configuration or any combination configuration, if desired.

Figure 10:
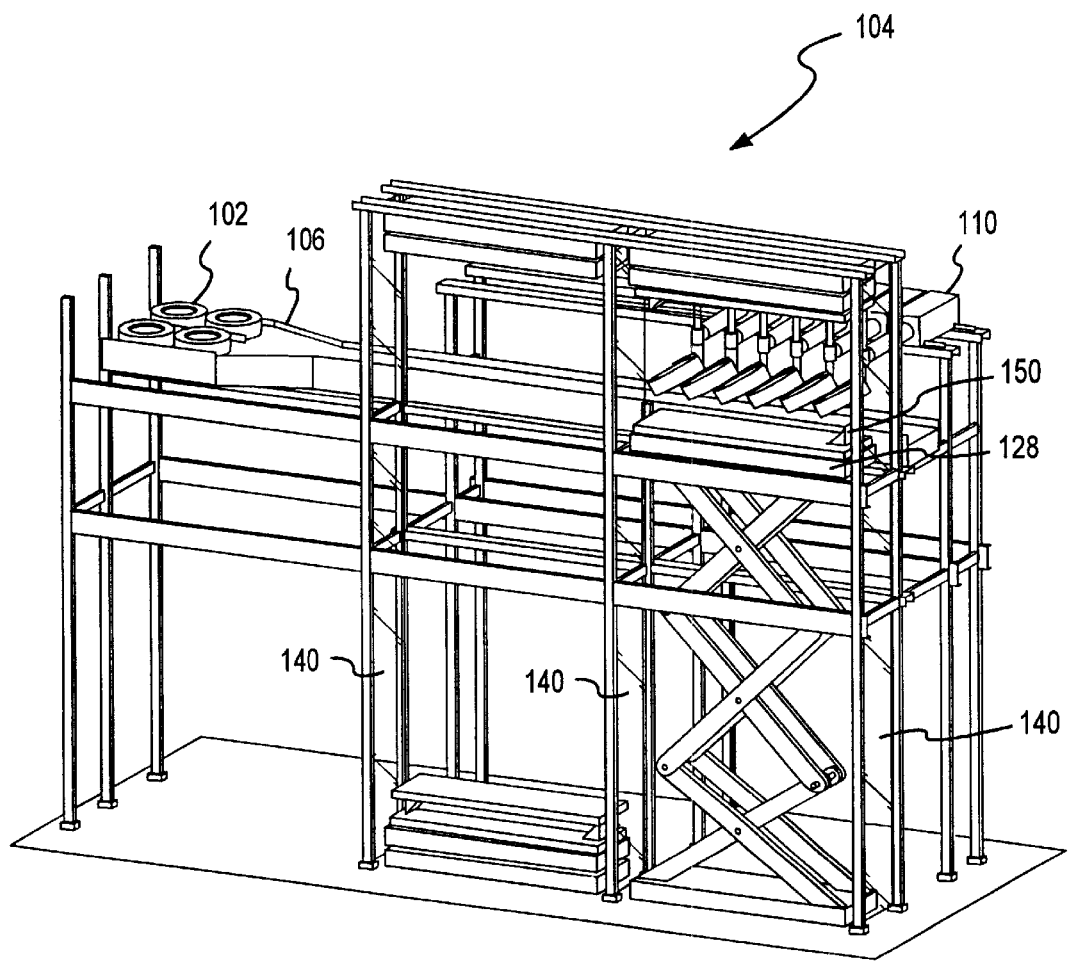
FIG. 10 is an illustration of an exemplary tire loading and stacking system depicting a plurality of tires being placed upon a lower retainer of a tire transport frame by a plurality of pick-and-place loaders.

Referring to FIG. 10, in an exemplary embodiment, the system includes retention panels 140 to prevent expansion or translation of the tires in a first or second direction, for example in a horizontal plane, in response to compression in a third direction, for example the vertical direction. Put another way, the retention panels 140 bound the sides of the load during compression. As one skilled on the art appreciates, the term "retention panel", as used herein, refers broadly to any structure suitable for bounding the sides of the load as the load is being compressed. For example, in an exemplary embodiment, a retention panel may comprise one or more members, such as a bar or a tube or a pipe or the like, or a combination thereof, so long as the member or members serve to bound the sides of the load as the load is being compressed. In another exemplary embodiment, the retention panels are telescoping such that the contacted surfaces translate as the tires are compressed, thereby minimizing their relative movement with respect to the tires. In a further exemplary embodiment, the retention panels 140 may comprise dual sets of members disposed substantially parallel to one another in the direction in which the tires are compressed. These dual sets of members emanate alternatingly from the vicinity of the upper retainer and the lower retainer such that as the upper retainer and the lower retainer are forced together as the tires are compressed, the dual sets of members translate in opposite directions relative to one another.

In another exemplary embodiment, the retention panels 140 may be flat. Further, in a preferred embodiment, the retention panels 140 are concave toward the inside of the tire transport frame 122. The use of curved retention panels is beneficial because it increases the area of contact with the contained tires and prevents flattening of the contacted tires. By maximizing the area of the tires contacted and by retaining the tires within a curved structure, the compressive loads that contain the tires are distributed across a larger section of the tire tread and less deformation occurs.

It has been discovered that containing the tires during compression may cause damage to the tires by the binding of the tires against the retention panels 140. It has also been discovered that binding of the tires during compression may be minimized by reducing the friction of the surface of the retention panels 140. Thus, in exemplary embodiments, the retention panels 140 bear a substantially smooth surface and/or are coated with a friction reducing material and/or are lubricated with a viscous lubricant.

The locking apparatus 134 of the instant invention is a mechanism for locking the retainers together. In an exemplary embodiment, the locking apparatus 134 comprises a single tension member that may encompass the compressed stack of tires to form a loaded tire transport frame 122. A suitable tension member may be a metal band as is common in the art. As shown in FIG. 14, in an another exemplary embodiment, the locking apparatus 134 comprises a plurality of tension members. To enable the locking apparatus 134 to retain a compressed stack of tires in a state of compression, the locking apparatus has a structural feature that is adapted to engage a complementary structural feature on the upper retainer 130 and the lower retainer 126. These complementary structural features may be, for example, a hook on one member and a loop on the other, or an L-shaped feature on the end of the locking apparatus and a corresponding ledge or hole feature on the upper retainer 130 or lower retainer 126, or a hole in the locking apparatus and a bolt or screw for fastening the locking apparatus to the upper retainer 130 or lower retainer 126, or any other means commonly known in the art for structurally retaining two members in tension. As discussed above, the locking apparatus 134 is of sufficient structural integrity to maintain the set of the compressed tires in a state of compression. In addition, the locking apparatus 134 may optionally be adapted to withstand compressive loads so as to support external loads and prevent compression of the tire transport frame 122. This latter use of tension/compression members prevents sagging of the tire transport frame 122, which may occur as a result of settling of the tires and may also enable the stacking of loaded tire transport frames 122 or loading of other materials on top of the tire transport frames 122. In this latter embodiment, the structural features for fastening the locking apparatus to the upper retainer 130 and the lower retainer 126 are adapted to withstand appropriate compressive loads.

Figure 15:
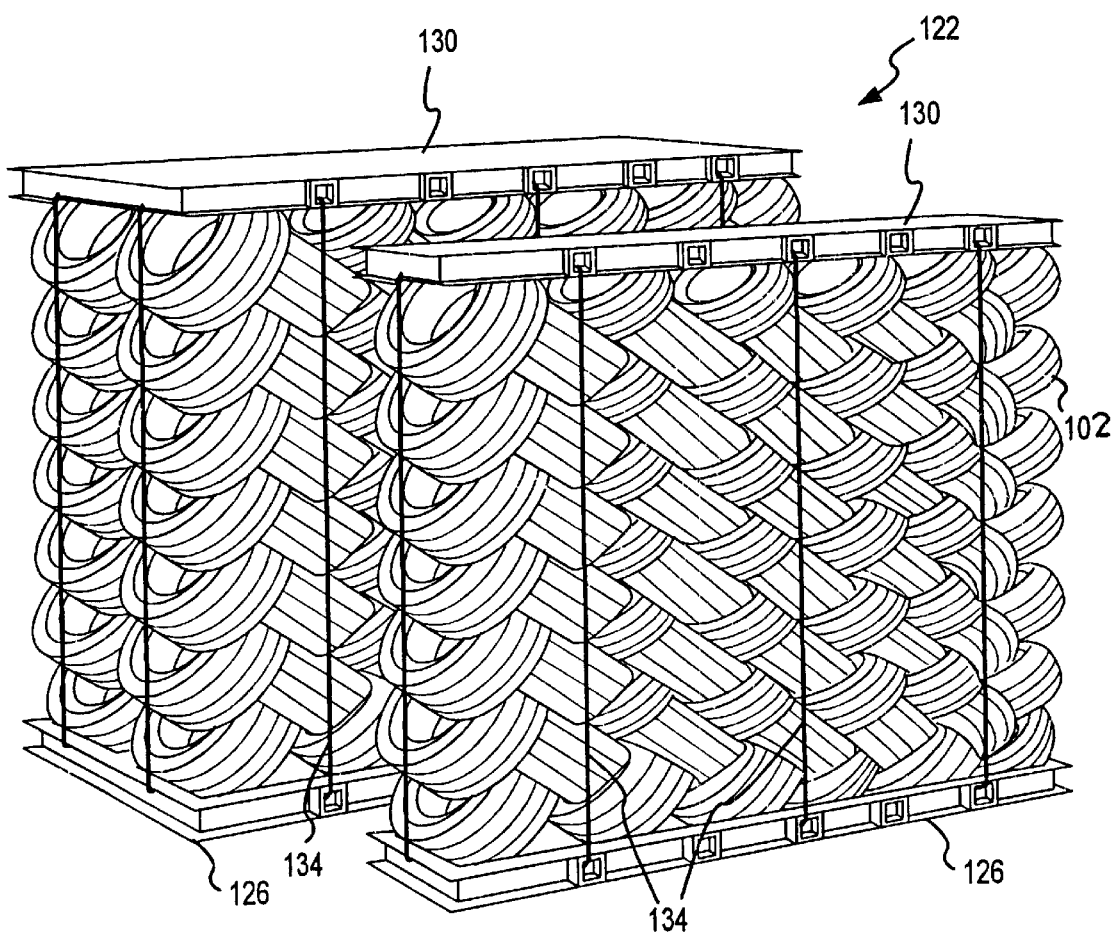
FIG. 15 is an illustration of two exemplary herringbone pattern stacks of tires in a state of compression retained by exemplary tire transport frames, one depicting a double row stack of tires and the other depicting a single row stack of tires, both depicting loaded tire transport frames.

As shown in FIG. 15, in an exemplary embodiment, the tire transport tire transport frame 122 of the instant invention comprises an upper retainer 130 and a lower retainer 126 wherein the upper retainer 130 and the lower retainer 126 are locked together with compressed tires between them and the compressed tires are preloaded with a compression selected to maintain the structural integrity of the loaded tire transport frame while not resulting in or causing an excessive amount of plastic deformation of the tires. The upper retainer 130 and the lower retainer 126 may then be locked together in such a manner that the tires cannot move or shift position within the tire transport frame 122. Such a locking apparatus 134 may comprise any structure sufficient to maintain tension between the upper retainer 130 and the lower retainer 126 such as rods, chains, cables, rope, or the like. In another exemplary embodiment, the locking apparatus may additionally be constructed to withstand compression of the tire transport frame from external forces.

Figure 16:
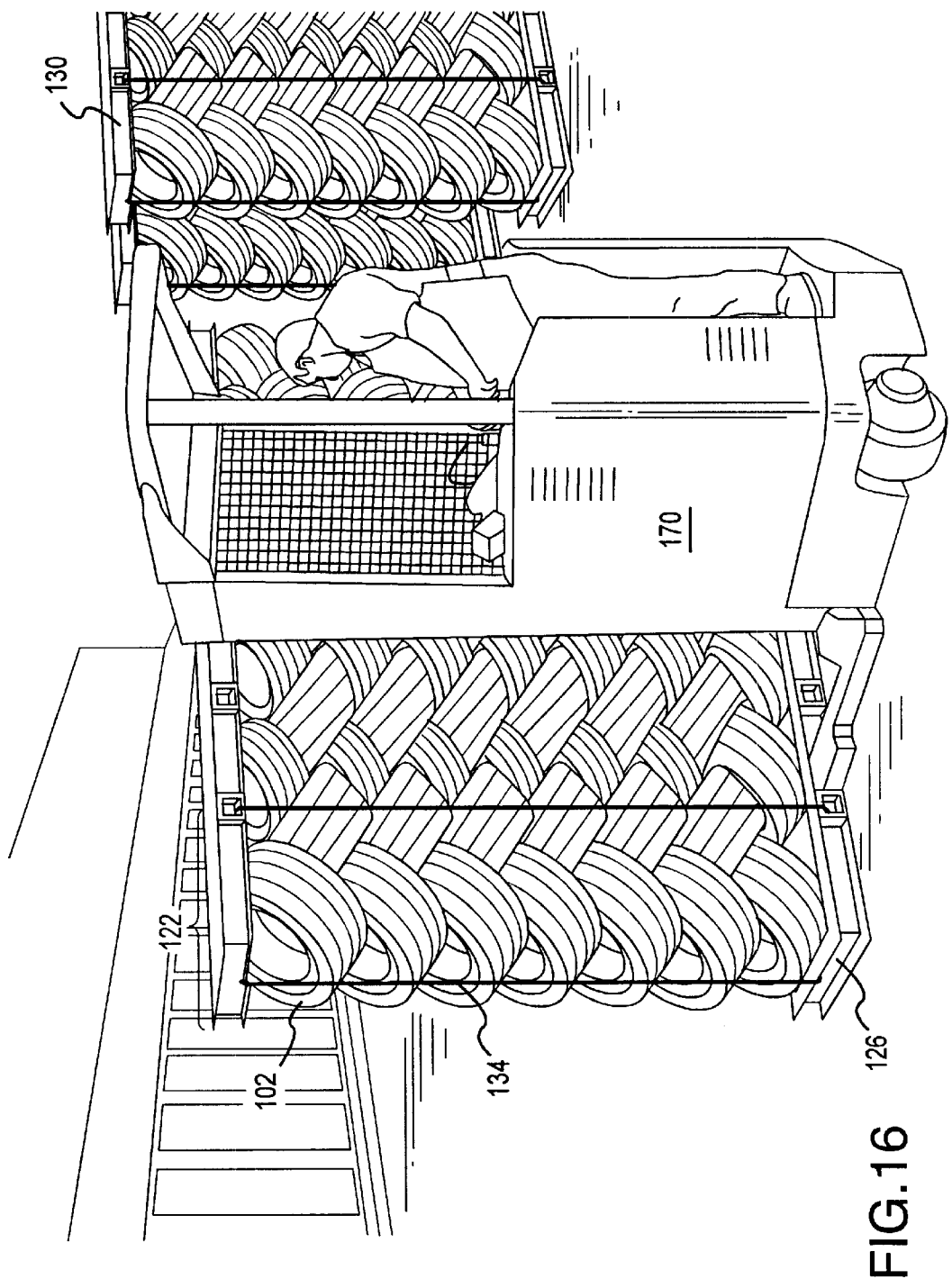
FIG. 16 is an illustration of an exemplary herringbone pattern stacks of tires in a state of compression retained by an exemplary tire transport frame to form a loaded tire transport frame, the loaded tire transport frame being transported by a forklift.
Figure 17:
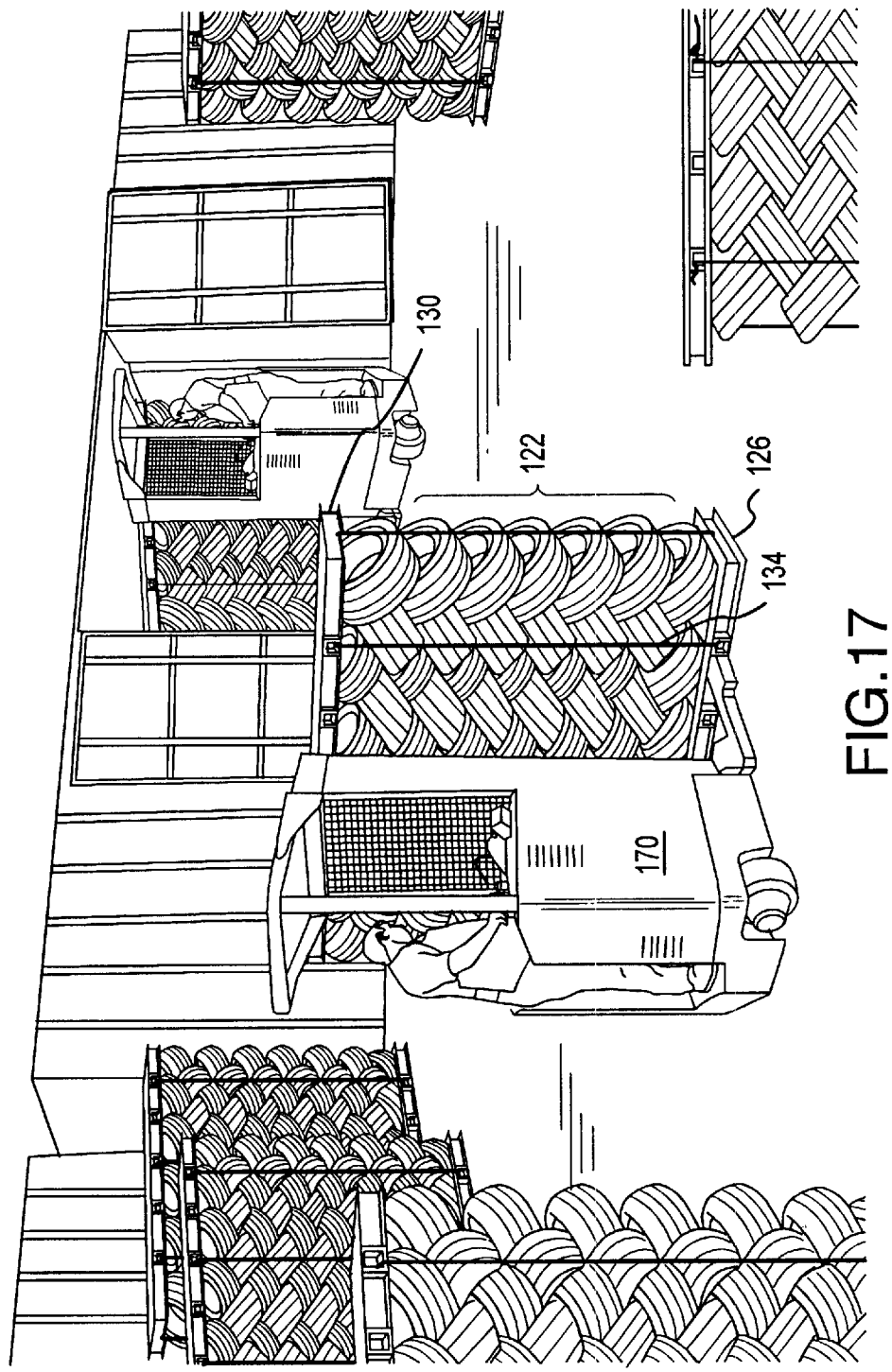
FIG. 17 is an illustration of exemplary herringbone pattern stacks of tires in a state of compression retained by exemplary tire transport frames to form loaded tire transport frames, the loaded tire transport frames being transported by forklift and being loaded into rail cars.

As shown in FIG. 16, the tire transport frame 122 is then moved into a storage and/or transportation vessel or to a storage area by forklift 170 or other means. As shown in FIG. 17, the tires may be loaded by forklift 170 into a railcar.

Figure 18:
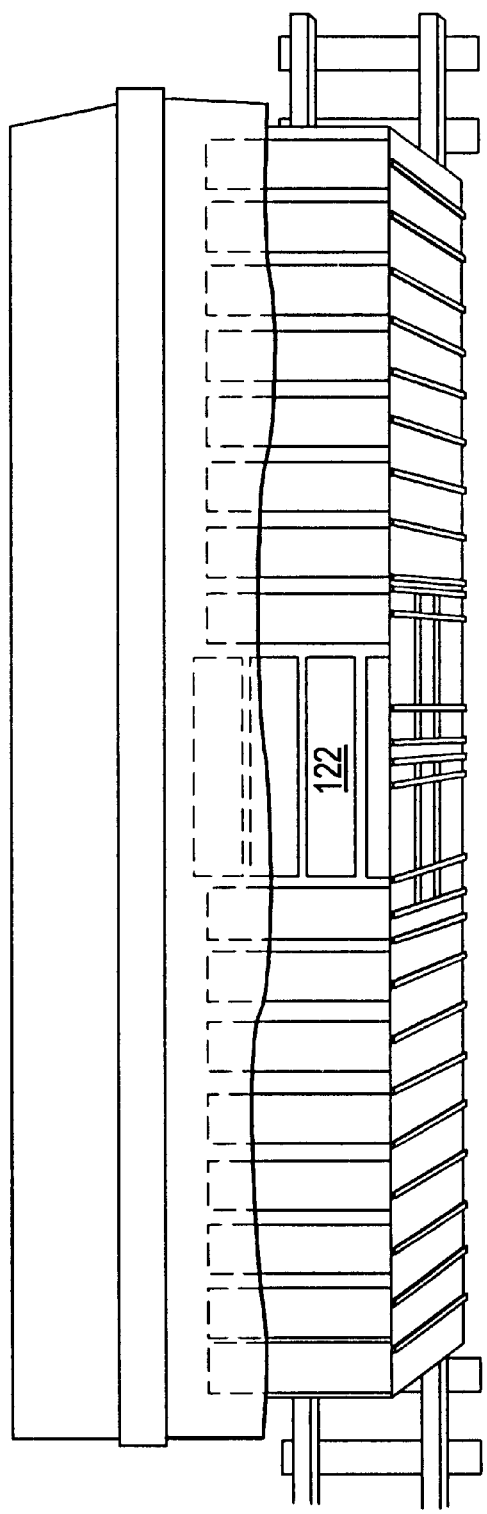
FIG. 18 is an illustration of exemplary loading pattern for loading stacks of tires in compression retained by exemplary tire transport frames, the loaded tire transport frames having been loaded into a rail car.
Figure 19:
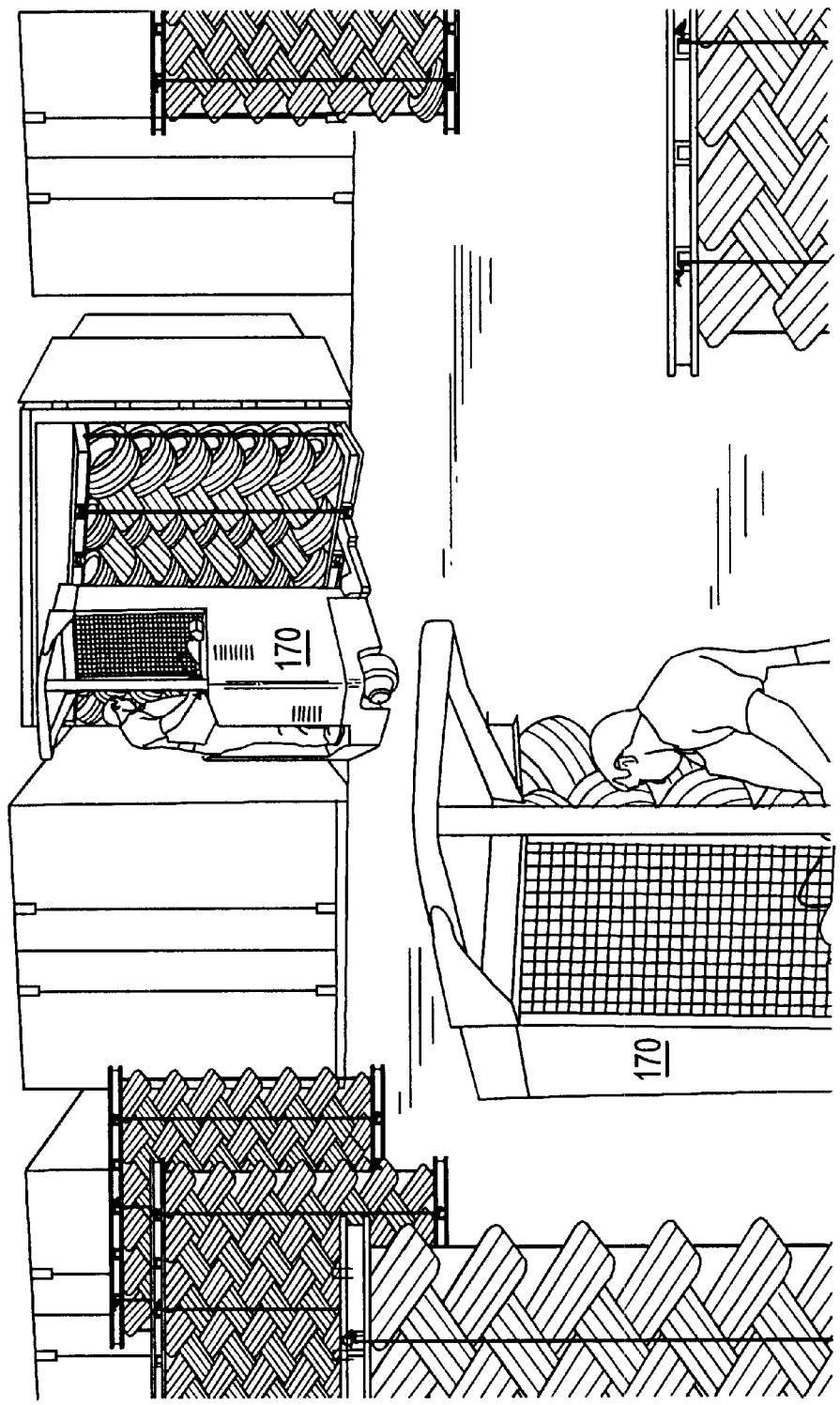
FIG. 19 is an illustration of exemplary herringbone pattern stacks of tires in a state of compression retained by exemplary tire transport frames, the loaded tire transport frames being transported by forklift and being loaded into truck-trailers.

As shown in FIG. 18, a suitable arrangement for utilizing the space within a rail car may be achieved using the system and method of the instant invention where the railcar is loaded from its side. In this exemplary embodiment, each loaded tire transport frame is placed in the rail car from the railcar's side and is rotated about ninety degrees before being moved to the end of the rail car or against the loaded tire transport frame that was previously placed in the railcar. The railcar is filled in this manner from its ends to the center, leaving just enough space for a final set of stacks to be placed directly through the door without being rotated. As shown in FIG. 19, the system and method of the instant invention also provides for the efficient loading of a truck trailer. In the case of the loading of truck trailers, the loaded tire transport frames are placed directly into the truck trailer from its end and are moved to the end of the trailer or against the loaded tire transport frame that was previously placed in the trailer.

Once the vessel reaches its destination or completes its term of storage, the loaded tire transport frames are unloaded by forklift and the tires may automatically be removed from the same tire transport frame 122 using another automatic tire loading and unloading system. To unload a loaded tire transport frame, the loading process is simply reversed. The loaded tire transport frame is first placed on the table, the upper retainer 130 is unlocked, and the tires are then allowed to expand in a controlled manner. The table may then be raised as each row is automatically unloaded by the pick-and-place loaders. Finally, the unloaded upper retainer 130 and the lower retainer 126 may then be shipped back to the tire manufacturing plant for reuse. Cost of returning the retainers is wasted cost, so the retainers are designed to minimize return transportation cost.

Tire transport frames 122 may be provided in a variety of sizes to make full use of the space available in the storage and/or transportation vessel for which the tire transport frame 122 are intended. Exemplary sizes include semi-truck trailers, rail cars, oceangoing containers, and the like. In addition, the weight of the tire transport frame 122 is minimized in order to maximize the payload capacity of the tire transport frame 122 within the storage and/or transportation vessel. Further, to facilitate the return of the upper retainer 130 and the lower retainer 126 of the tire transport frame 122 to the origin of the tires for future use, the retainers are preferably constructed to be interchangeable and to nest when they are stacked. In addition, although the scope of the invention includes the use of standard wooden or steel pallets as retainers, the retainers are preferably constructed of a lightweight material such as aluminum, aluminum alloy, chrome-molybdenum alloy, graphite composite, fiberglass, and/or plastic. Further, the structural design of the upper retainer 130 and lower retainer 126 are such that the strength to weight ratio is maximized. Therefore, honeycomb, tubular frame, and monocoque, or semi-monocoque structures are preferred over solid structures with similar strength. In an exemplary embodiment, the upper retainer 130 and the lower retainer 126 are constructed as a tubular frame structure bonded with a thin sheet or mesh serving as a web. As shown in FIG. 11, additional features of the lower retainer 126 includes the optional incorporation of an integral wedge 150 to support the first row of tires. In an exemplary embodiment, this integral wedge 150 is hinged and adjustable to rotate into position when the lower retainer 126 is placed into the loader.

The system is designed to handle all sizes of passenger tires, to provide maximum compression of tires, to minimize the manual labor required for loading, unloading or compression and to be used with any standard box car. Further, the system is designed to handle multiple tires at a single time to automatically compress the tires and to provide tooling that holds one or two rows of tires. The system further enables a forklift to move the compressed tires in the tooling and the tooling may be returned by truck or rail.

It should be understood, however, that the detailed description and specific examples, while indicating exemplary embodiments of the instant invention, are given for the purposes of illustration only, and not of limitation. Many changes and modifications within the scope of the instant invention may be made without departing from the spirit thereof, and the invention includes all such modifications. The corresponding structures, materials, acts, and equivalents of all elements in the claims below are intended to include any structure, material, or acts for performing the functions in combination with other claimed elements as specifically claimed. The scope of the invention should be determined by the appended claims and their legal equivalents, rather than by the examples given above. For example the steps recited in any method claims may be executed in any order and are not limited to the order presented in the claims or drawings. Moreover, no element is essential to the practice of the invention unless specifically described herein as "critical" or "essential".

What is claimed is:

1. A system for loading tires for storeage and/or shipping in a vessel comprising:
    a tire transport frame configured for receiving and retaining a plurality of tires stacked in a herringbone pattern and for maintaining said plurality of tires in a compressed state while said frame is loaded into said vessel;
    a plurality of pick-and-place loaders configured for seizing a plurality of tires, arranging the plurality of tires in herringbone pattern alignment for placement in the tire transport frame, placing, external to said vessel, the plurality of tires together, and placing, external to said vessel, the plurality of tires into the tire transport frame to form a stack of tires in a herringbone pattern; and
    a compressor for compressing said stack of tires in a first direction for retention within said tire transport frame.

2. The system of claim 1 wherein at least one of said pick-and-place loaders has a tire seizer adapted to seize a tire by contacting the inside diameter of the tire.

3. The system of claim 1 wherein at least one of said pick-and-place loaders has a tire seizer adapted to seize a tire by contacting and compressing the outside diameter of the tire in the tire's radial direction.

4. The system of claim 1 wherein at least one of said pick-and-place loaders has a tire seizer adapted to seize a tire by contacting and compressing the sidewalls of the tire in the direction of the tire's axis of rotation, said compressing performed with sufficient force to enable said tire seizer to rotate said tire about a horizontal axis.

5. The system of claim 1 wherein s aid compressor comprises a scissors lift.

6. The system of claim 1 where in said compressor comprises a plurality of retention panels adapted to prevent expansion of said stack of tires in a direction substantially transverse to said first direction.

7. The system of claim 6 wherein said retention panels have a smooth surface.

8. The system of claim 6 wherein said retention panels are lubricated.

9. The system of claim 6 wherein said retention panels are telescoping.

10. The system of claim 1 wherein said tire transport frame comprises a lower retainer and a locking apparatus.

11. The system of claim 10 wherein said lower retainer is adapted to receive the forks of a forklift.

12. The system of claim 10 wherein said lower retainer comprises a material selected from the group consisting of wood, steel, aluminum, aluminum alloy, chrome-molybdenum alloy, graphite composite, fiberglass, and plastic.

13. The system of claim 10 wherein said lower retainer comprises a honeycomb structure.

14. The system of claim 10 wherein said lower retainer comprises a monocoque structure.

15. The system of claim 10 wherein said tire transport frame further comprises an upper retainer.

16. The system of claim 15 wherein said upper retainer comprises a material selected from the group consisting of wood, steel, aluminum, aluminum alloy, chrome-molybdenum alloy, graphite composite, fiberglass, and plastic.

17. The system of claim 15 wherein said upper retainer comprises a honeycomb structure.

18. The system of claim 15 wherein said upper retainer comprises a monocoque structure.

19. The system of claim 15 wherein said upper retainer and said lower retainer are adapted to nest within one another.

20. The system of claim 15 wherein said locking apparatus comprises a plurality of tension members.

21. The system of claim 20 wherein at least one of said tension members is a rod.

22. The system of claim 20 wherein at least one of said tension members is a chain.

23. The system of claim 20 wherein at least one of said tension members is a rope.

24. The system of claim 20 wherein at least one of said tension members is a cable.

25. The system of claim 20 wherein at least one of said tension members is a metal band.

26. The system of claim 15 wherein said locking apparatus is adapted to withstand a compressive load so as to enable said tire transport frame to support a load placed atop said tire transport frame.

27. The system of claim 10 wherein said locking apparatus comprises at least one tension member for encompassing the compressed stack of tires.

28. The system of claim 27 wherein said tension member is a metal band.

29. The system of claim 1 wherein said step of arranging includes rotating said plurality of tires such that the axis of rotation of all of said plurality of tires rotate in substantially the same plane.

30. A system for loading tires for storage and/or shipping in a vessel comprising:
- a tire transport frame configured for receiving and retaining a plurality of tires stacked in a herringbone pattern and for maintaining said plurality of tires in a compressed state while said frame is being loaded into said vessel;
- a pick-and-place loader configured for seizing one or more tires, arranging said one or more tires into herringbone pattern alignment for placement in the tire transport frame, and placing, external to said vessel, said one or more tires into the tire transport frame to form a stack of tires in a herringbone pattern; and
- a compressor for compressing said stack of tires in a first direction for retention within said tire transport frame.

* * * * *